United States Patent
Wei

(10) Patent No.: US 11,270,146 B2
(45) Date of Patent: Mar. 8, 2022

(54) TEXT LOCATION METHOD AND APPARATUS

(71) Applicant: KONICA MINOLTA BUSINESS SOLUTIONS U.S.A., INC., San Mateo, CA (US)

(72) Inventor: Junchao Wei, San Mateo, CA (US)

(73) Assignee: KONICA MINOLTA BUSINESS SOLUTIONS U.S.A., INC., San Mateo, CA (US)

( * ) Notice: Subject to any disclaimer, the term of this patent is extended or adjusted under 35 U.S.C. 154(b) by 0 days.

(21) Appl. No.: 16/836,662

(22) Filed: Mar. 31, 2020

(65) Prior Publication Data

US 2021/0303901 A1 Sep. 30, 2021

(51) Int. Cl.
*G06K 9/46* (2006.01)
*G06T 11/20* (2006.01)
(Continued)

(52) U.S. Cl.
CPC ............... *G06K 9/46* (2013.01); *G02B 27/46* (2013.01); *G06F 40/10* (2020.01); *G06K 9/72* (2013.01);
(Continued)

(58) Field of Classification Search
CPC .. G06K 9/46; G06K 2209/00; G06K 2209/01; G06T 11/20; G06T 9/002;
(Continued)

(56) References Cited

U.S. PATENT DOCUMENTS

| 5,675,665 A | * | 10/1997 | Lyon | G06K 9/72 382/177 |
| 6,021,218 A | * | 2/2000 | Capps | G06K 9/222 382/187 |

(Continued)

OTHER PUBLICATIONS

Krizhevsky et al., "ImageNet Classification with Deep Convolutional Neural Networks", Advances in Neural Information Processing Systems 25, edited by F. Pereira and C.J.C. Burges and L. Bottou and K.Q. Weinberger, Conference Proceedings, Neural Information Processing Systems 2012.
(Continued)

*Primary Examiner* — Oneal R Mistry
*Assistant Examiner* — Nicolas James Boyajian
(74) *Attorney, Agent, or Firm* — Squire Patton Boggs (US) LLP

(57) ABSTRACT

Aspects of the present invention provide a new text location technique, which can be applied to general handwriting detection at a variety of levels, including characters, words, and sentences. The inventive technique is efficient in training deep learning systems to locate text. The technique works for different languages, for text in different orientations, and for overlapping text. In one aspect, the technique's ability to separate overlapping text also makes the technique useful in application to overlapping objects. Embodiments take advantage of a so-called skyline appearance that text tends to have. Recognizing a skyline appearance for text can facilitate the proper identification of bounding boxes for the text. Even in the case of overlapping text, discernment of a skyline appearance for words can help with the proper identification of bounding boxes for each of the overlapping text words/phrases, thereby facilitating the separation of the text for purposes of recognition.

16 Claims, 11 Drawing Sheets

(51) Int. Cl.
*G02B 27/46* (2006.01)
*G06K 9/72* (2006.01)
*G06F 40/10* (2020.01)
*H04N 1/00* (2006.01)
*G06F 40/20* (2020.01)
*G06T 9/00* (2006.01)
*G06F 40/00* (2020.01)

(52) U.S. Cl.
CPC ......... *G06T 11/20* (2013.01); *H04N 1/00331* (2013.01); *G06F 40/00* (2020.01); *G06F 40/20* (2020.01); *G06K 2209/00* (2013.01); *G06K 2209/01* (2013.01); *G06T 9/002* (2013.01); *G06T 2210/12* (2013.01)

(58) Field of Classification Search
CPC ................. G06F 40/00; G06F 16/5846; G05B 2219/36398; A61B 2034/2065; A22C 17/0086; A61G 2205/40
See application file for complete search history.

(56) References Cited

U.S. PATENT DOCUMENTS

| | | |
|---|---|---|
| 10,445,569 B1 * | 10/2019 | Lin ........................ G06F 40/279 |
| 2001/0033694 A1 * | 10/2001 | Goodman .......... G06K 9/00859 |
| | | 382/229 |
| 2006/0193518 A1 * | 8/2006 | Dong ................... G06K 9/3283 |
| | | 382/186 |
| 2018/0137349 A1 * | 5/2018 | Such ..................... G06N 3/0454 |
| 2020/0302208 A1 * | 9/2020 | Hoehne .............. G06K 9/00442 |

OTHER PUBLICATIONS

Long et al., "Fully Convolutional Networks for Semantic Segmentation", arXiv:1411.4038v2 [cs.CV], last revised Mar. 8, 2015.
Redmon et al., "YOLOv3: An Incremental Improvement", arXiv:1804.02767v1 [cs.CV], last revised Apr. 8, 2018.
Redmon et al., "You Only Look Once: Unified, Real-Time Object Detection", arXiv:1506.02640v5 [cs.CV], last revised May 9, 2016.
Shi et al., "An End-to-End Trainable Neural Network for Image-based Sequence Recognition and Its Application to Scene Text Recognition", arXiv:1507.05717v1 [cs.CV], last revised Jul. 21, 2015.
Zhou et al., "EAST: An Efficient and Accurate Scene Text Detector", arXiv:1704.03155v2 [cs.CV], last revised Jul. 10, 2017.

* cited by examiner

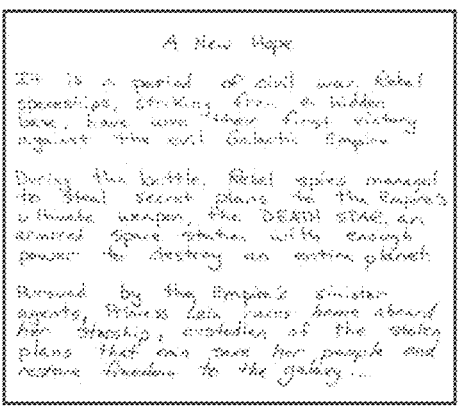
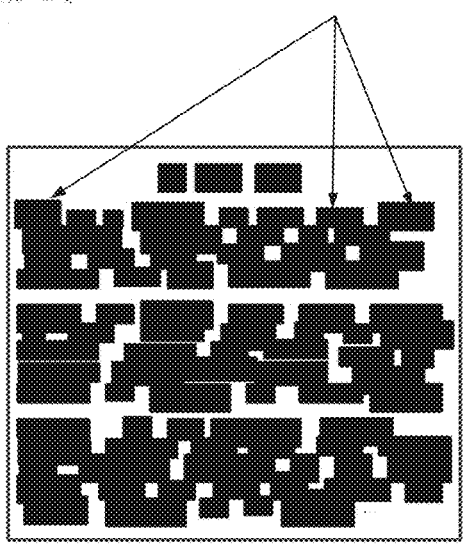
FIG. 4
FIG. 5

TEXT LOCATION METHOD AND APPARATUS

BACKGROUND OF THE INVENTION

For Intelligent Character Recognition (ICR) and Optical Character Recognition (OCR), there are known steps to recognize text. A first step is to acquire a bounding box of each candidate word, character, or group of characters to define a text region. A second step is to crop the identified text region using the bounding box. A third step is to send the cropped text to an engine for recognition. Erroneous identification, including inaccurate bounding boxes, can lead to errors.

Computer Vision (CV) techniques have focused extensively on spotting objects. Deep learning techniques have come into play in recent years to help train CV systems. Solid and accurate image processing has been important to train deep learning systems. One image processing technique, YOLO (You Only Look Once), has undergone various iterations. YOLOv3 has been used for detecting natural scenes, including objects such as cars, people, planes, and motorcycles. In terms of detecting such objects, there are relatively few variants that occur, compared to such things as handwriting, which has numerous variants.

Another image processing technique, EAST (Efficient and Accurate Scene Text Detector), has achieved good results for pulling text out of a natural scene, but has not worked as well for long strings of text, or for overlapping text, as often can occur in handwritten text. EAST also can be computationally intensive for text, as EAST employs pixel by pixel determination.

It would be desirable to provide deep learning based text location that handles so many of the variations and difficulties that handwritten text can present.

SUMMARY OF THE INVENTION

Aspects of the present invention provide a new text location technique, which can be applied to general handwriting detection at a variety of levels, including characters, words, and sentences. The inventive technique is efficient in training deep learning systems to recognize text. The technique works for different languages, for text in different orientations, and for overlapping text. In one aspect, the technique's ability to separate overlapping text also makes the technique useful in application to overlapping objects.

In one aspect, embodiments according to the invention take advantage of a so-called skyline appearance that text tends to have. Just as letters tend to have certain shapes, words as combinations of letters have shapes, or outlines, or skylines. For example, the lowercase letter "d" tends to have a higher profile than does a lowercase letter "a". A lowercase letter "g" or "p" will extend beneath a normal writing line. Combinations of letters forming words therefore will present different appearances against a contrasting background. Even different handwriting styles, or different fonts, will present words with such different appearances. The general appearance of a letter of course affects how the letter appears in a word. For ease of reference herein, the appearance of a word against a contrasting background will be referred to as a skyline, even when involving letters that may extend below a normal writing line.

Recognizing a skyline appearance for text can facilitate the proper identification of bounding boxes for the text. Even in the case of overlapping text, discernment of a skyline appearance for words can help with the proper identification of bounding boxes for each of the overlapping text words/phrases, thereby facilitating the separation of the text for purposes of recognition.

BRIEF DESCRIPTION OF THE DRAWINGS

FIG. 4 depicts sample handwritten text to be recognized;

FIG. 5 depicts the result of processing according to one of the channels in FIGS. 3 and 4;

DETAILED DESCRIPTION

As noted earlier, handwritten text can present various challenges to a text recognition engine. First, there are many different handwriting styles, depending on individuals. The individual may use block print, or may print in all lower or upper case letters, or use cursive writing. Second, handwritten text can overlap, whether top and bottom (or bottom and top) or side to side. The overlapping can present challenges for a text recognition engine. Better text identification can lead to better text recognition. Third, because of the many different handwriting styles, among other things, handwritten text can vary greatly in letter size. That variation can present challenges in training a detection engine. Fourth, the different styles and appearances, not only on an individual basis but on a person by person basis, can present further challenges for identifying an appropriate data set to train a text detection and recognition engine. Fifth, it has been found to be quite computationally expensive to merge bounding boxes at a pixel level, and to compute the Intersection over Union (IoU) of bounding boxes using training sets. Aspects of the present invention address all of these issues, as now will be discussed.

Figure 1:
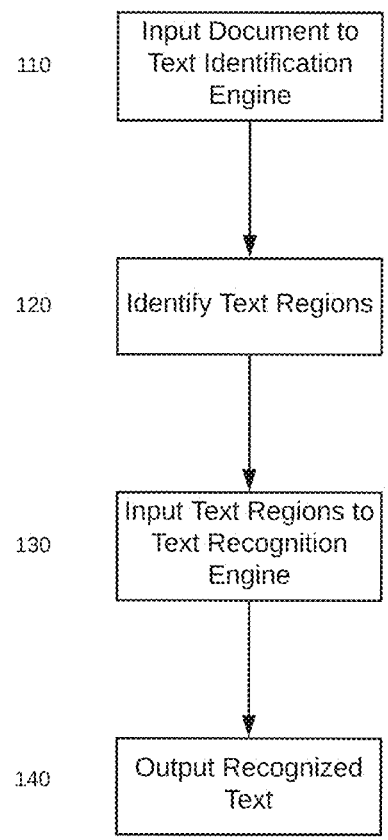
FIG. 1 is a high level flow chart of the overall sequence of operations involved in text identification and recognition.

FIG. 1 shows a standard flow of processing of text for image recognition. At 110, a document may be scanned, and the document contents input to a text identification engine. The document could be a page of text, or one or a plurality of images, with any of the images potentially having detectable text. At 120, the text identification engine may identify text regions from the overall document. The text regions are used to define bounding boxes for the text to be recognized. The text identification engine is what will be discussed in more detail herein. At 130, the identified text regions may be input to a text recognition engine. At 140, recognized text may be output.

Figure 2:
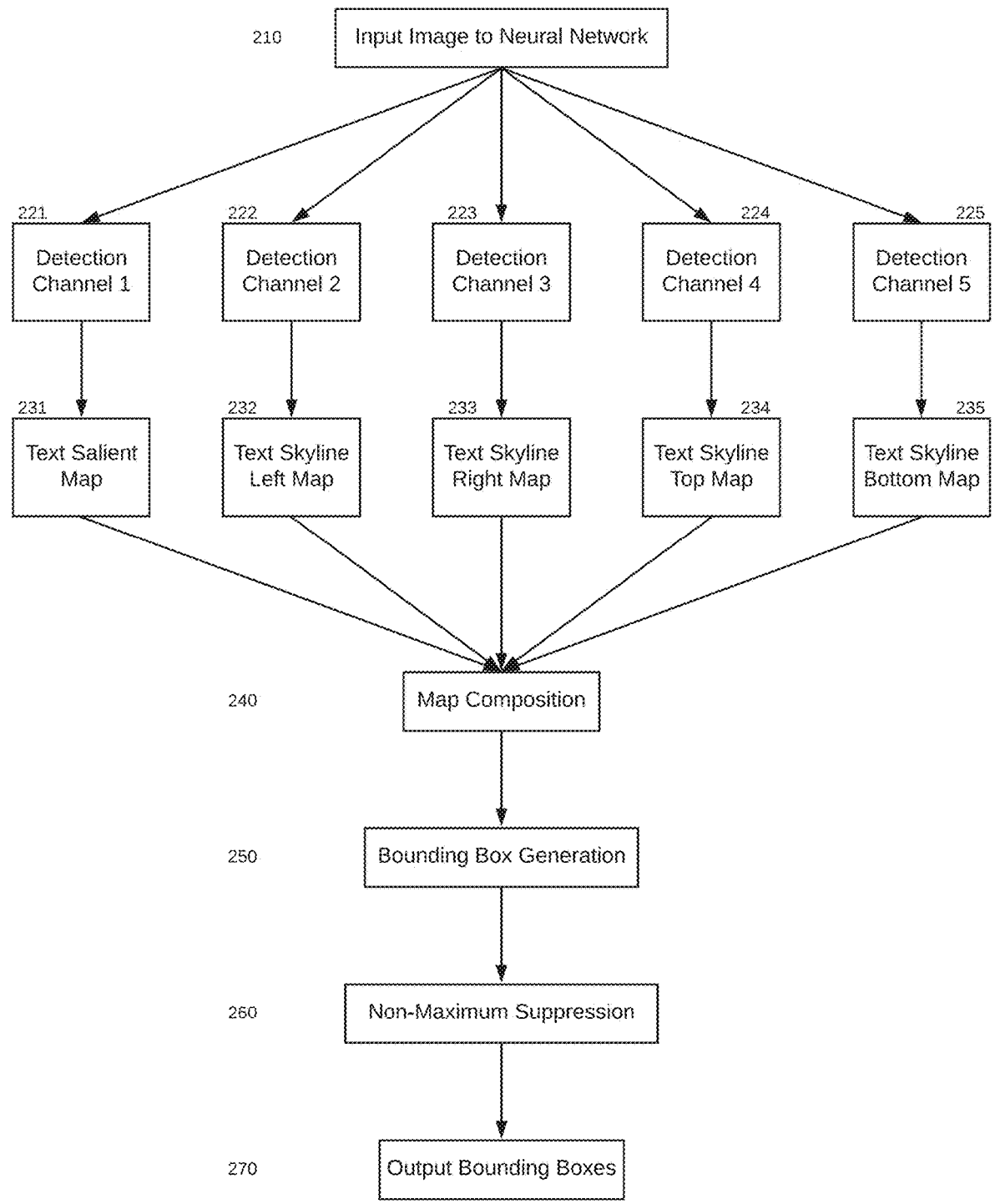
FIG. 2 is a high level diagram of process flow according to an embodiment.

FIG. 2 shows a more detailed flow for 120 (identifying text regions) in FIG. 1. In an embodiment, there are five channels to generate pixel-level segmentation maps to construct text kernels from which bounding boxes for text may be extracted.

At 210, an image may be input to a neural network, such as a convolutional neural network (CNN), a fully convolutional neural network (FCNN), or other suitable deep learning system. In an embodiment, the neural network is a Resnet backbone Fully Convolutional Network (FCN). In one aspect, the image that is input is a three-channel RGB color image. Five detection channels 221-225 receive the image. Detection channel 1 (221) outputs a text salient map at 231. In an embodiment, a text salient map may be a plurality of areas, each area covering an entire word. In devising the text salient map, the trained neural network takes advantage of a skyline appearance of each word, which covers a certain amount of territory on a printed page. Drawing a text salient map around a word's detected skyline thus will cover the entire word.

Each of detection channels 222-225 outputs a boundary for a different respective side of a detected skyline at 232-235, respectively. In an embodiment, detection channel 222 outputs a boundary of a left side of the skyline at 232, referred to as a skyline left map; detection channel 223 outputs a boundary of a right side of the skyline at 233, referred to as a skyline right map; detection channel 224 outputs a boundary of a top of the skyline at 234, referred to as a skyline top map; and detection channel 225 outputs a boundary of a bottom of the skyline at 235, referred to as a skyline bottom map.

The different map portions are output to a map composition section 240 which puts together a salient map and the individual maps to generate a bounding box for each word at 250. Recognizing that aspects of the invention are intended to address the situation with overlapping text, and therefore of overlapping boundary boxes, in an embodiment non-maximum suppression is applied at 260, to merge generated boundary boxes in a manner to be discussed in more detail herein. Finally, at 270, bounding boxes are output, one for each word. As will be appreciated from the following discussion, the resulting more accurate bounding box generation will facilitate more accurate text recognition. That is, more accurate text identification (location of text on a page or in an image) will lead to more accurate text recognition.

Figure 3:
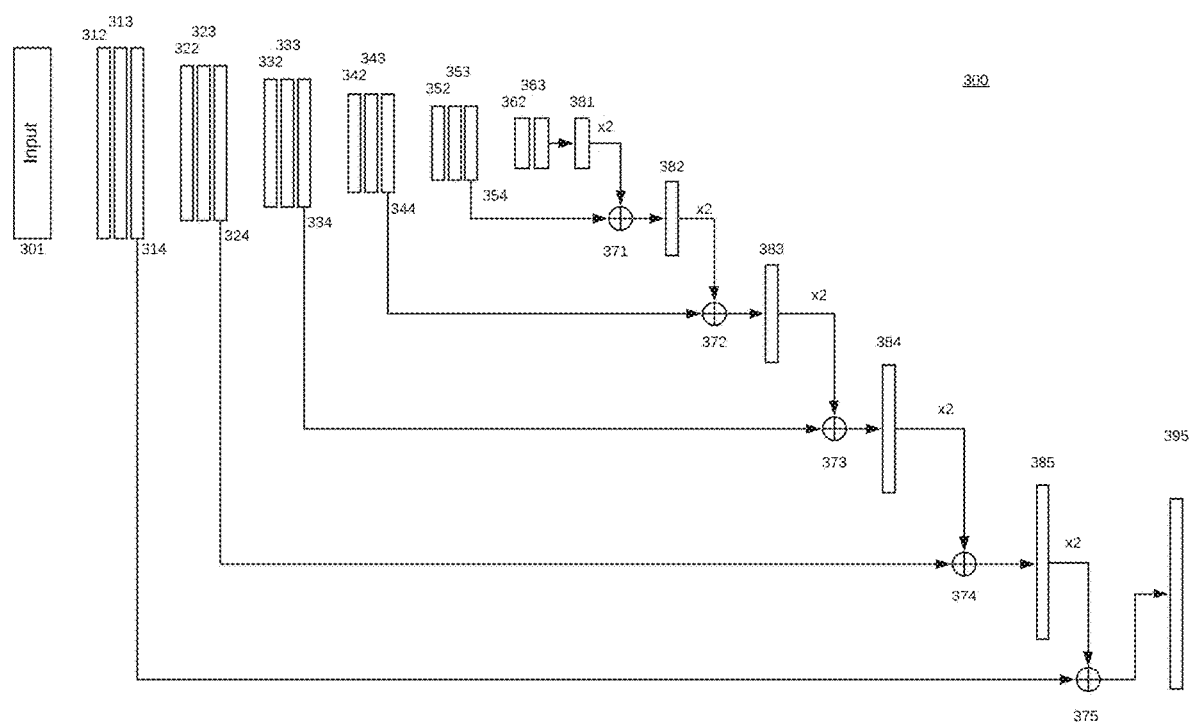
FIG. 3 is a high level diagram of exemplary neural network operation according to an embodiment.

FIG. 3 shows an example of a Resnet backbone based fully convolutional network (FCN) 300 with connected intermediate layers. An RGB image may be input at 301. Layers 312, 313; 322, 323; 332, 333; 342, 343; 352, 353; and 362, 363 are convolution layers within FCN 300. Layers 314, 324, 334, 344, and 354 are nonlinear layers within FCN 300. Layers 381-385 are intermediate, or deep layers.

At each nonlinear layer 314-354, there is a temporary output for merging an up-sampled feature map from a respective intermediate, or deep layer 381-385. The merged feature map becomes the intermediate layer for the next merge. The final outputs are five detected channels for the desired text features. Accordingly, in FIG. 3, at nonlinear layer 354, there is a temporary output for merging an up-sampled (x2) feature map from intermediate layer 381 at 371. At nonlinear layer 344, there is a temporary output for merging an up-sampled (x2) feature map from intermediate layer 382 at 372. At nonlinear layer 334, there is a temporary output for merging an up-sampled (x2) feature map from intermediate layer 383 at 373. At nonlinear layer 324, there is a temporary output for merging an up-sampled (x2) feature map from intermediate layer 384 at 374. Finally, at nonlinear layer 314, there is a temporary output for merging an up-sampled (x2) feature map from intermediate layer 385 at 375. The resulting output is a five channel detection layer 395, which has each of the five elements (salient map, left map, right map, top map, and bottom map) each word, for the generation of bounding boxes for each word, as will be discussed.

FIG. 4 shows a handwritten text sample. The particular sample chosen here is the initial quote that is displayed on the screen at the beginning of "Star Wars Episode IV: A New Hope". FIG. 5 shows a text body salient map that is detected in the first detection channel in detection layer 395 in FIG. 3. In an embodiment, all of the individual text regions are masked text regions 510, and are sent into the neural network (FCN) as training data. These masked text regions represent a probability that text appears in that region. In an embodiment, the regions tightly surround a masked word. In FIG. 5, some of the masked text regions 510 abut or even overlap.

Figure 6:
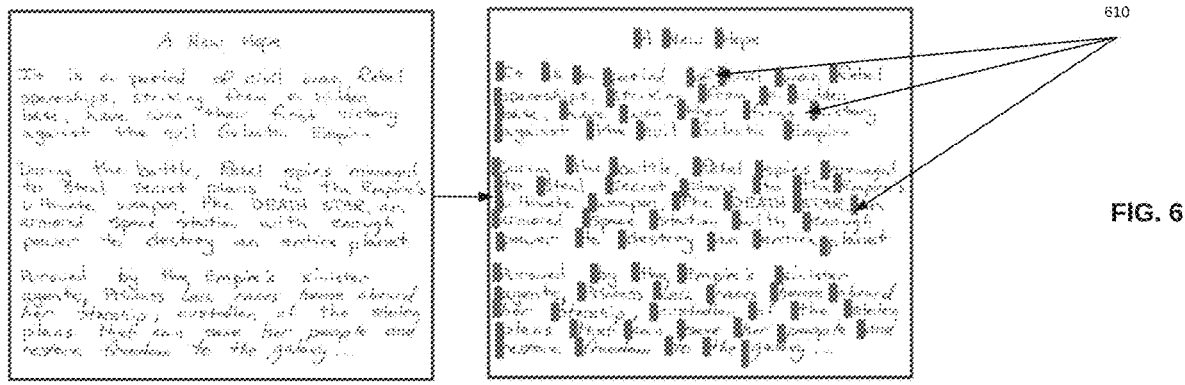
FIG. 6 depicts the result of processing according to another of the channels in FIGS. 3 and 4.

FIG. 6 shows a so-called text left map that is detected in the second detection channel in detection layer 395 in FIG. 3. Each mark 610 shows a starting position for a word in the text. Here, as training data, the starting edge of each word of text is marked. In an embodiment, a marked region may be on the order of 10 percent of text width, but different percentages may be appropriate for such a boundary, as ordinarily skilled artisans will appreciate. In one aspect, the marked region may not overlap with its corresponding text, but such overlap is possible. The amount of the marked region should be sufficient to capture a sufficient portion of the skyline.

Figure 7:
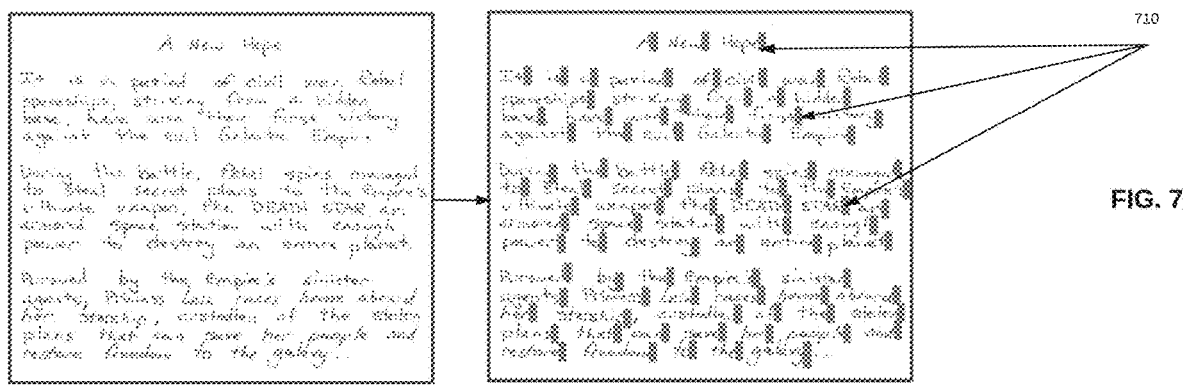
FIG. 7 depicts the result of processing according to yet another of the channels in FIGS. 3 and 4.

FIG. 7 shows a so-called text right map that is detected in the third detection channel in detection layer 395 in FIG. 3. Each mark 710 shows a starting position for a word in the text. Here, as training data, the finishing edge of each word of text is marked. In an embodiment, a marked region may be on the order of 10 percent of text width, but different percentages may be appropriate for such a boundary, as ordinarily skilled artisans will appreciate. In one aspect, the marked region may not overlap with its corresponding text, but such overlap is possible. Here again, the amount of the marked region should be sufficient to capture a sufficient portion of the skyline.

Figure 8:
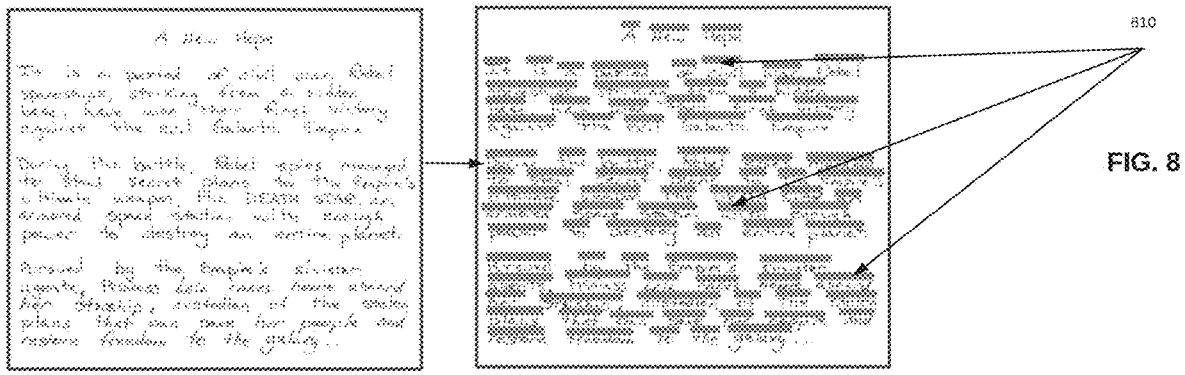
FIG. 8 depicts the result of processing according to still another of the channels in FIGS. 3 and 4.

FIG. 8 shows a so-called text top map that is detected in the fourth detection channel in detection layer 395 in FIG. 3. Each mark 810 shows an upper position for a word in the text. Here, as training data, the upper edge of each word of text is marked. In an embodiment, a marked region may be on the order of 30 percent of text width, but different percentages may be appropriate for such a boundary, as ordinarily skilled artisans will appreciate. In one aspect, the marked region may not overlap with its corresponding text, but such overlap is possible. As with the other maps in FIGS. 6 and 7, the amount of the marked region for the top map should be sufficient to capture a sufficient portion of the skyline.

Figure 9:
FIG. 9 depicts the result of processing according to yet still another of the channels in FIGS. 3 and 4.

FIG. 9 shows a so-called text bottom map that is detected in the fifth detection channel in detection layer 395 in FIG. 3. Each mark 910 shows a bottom position for a word in the text. Here, as training data, the bottom edge of each word of text is marked. In an embodiment, a marked region may be on the order of 30 percent of text width, but different percentages may be appropriate for such a boundary, as ordinarily skilled artisans will appreciate. In one aspect, the marked region may not overlap with its corresponding text, but such overlap is possible. As with the other maps in FIGS. 6 to 8, the amount of the marked region for the bottom map should be sufficient to capture a sufficient portion of the skyline.

By way of brief summary, FIGS. 5-9 show five different maps. FIG. 5 is a text salient map for the main text body. This map takes advantage of the skyline of a word, and is intended to cover the entire word. FIGS. 6-9 show skyline features for different sides of the text salient boxes in FIG. 5. As will be discussed with reference to FIG. 10, a text bounding box for each word is generated from these various maps.

Figure 10:
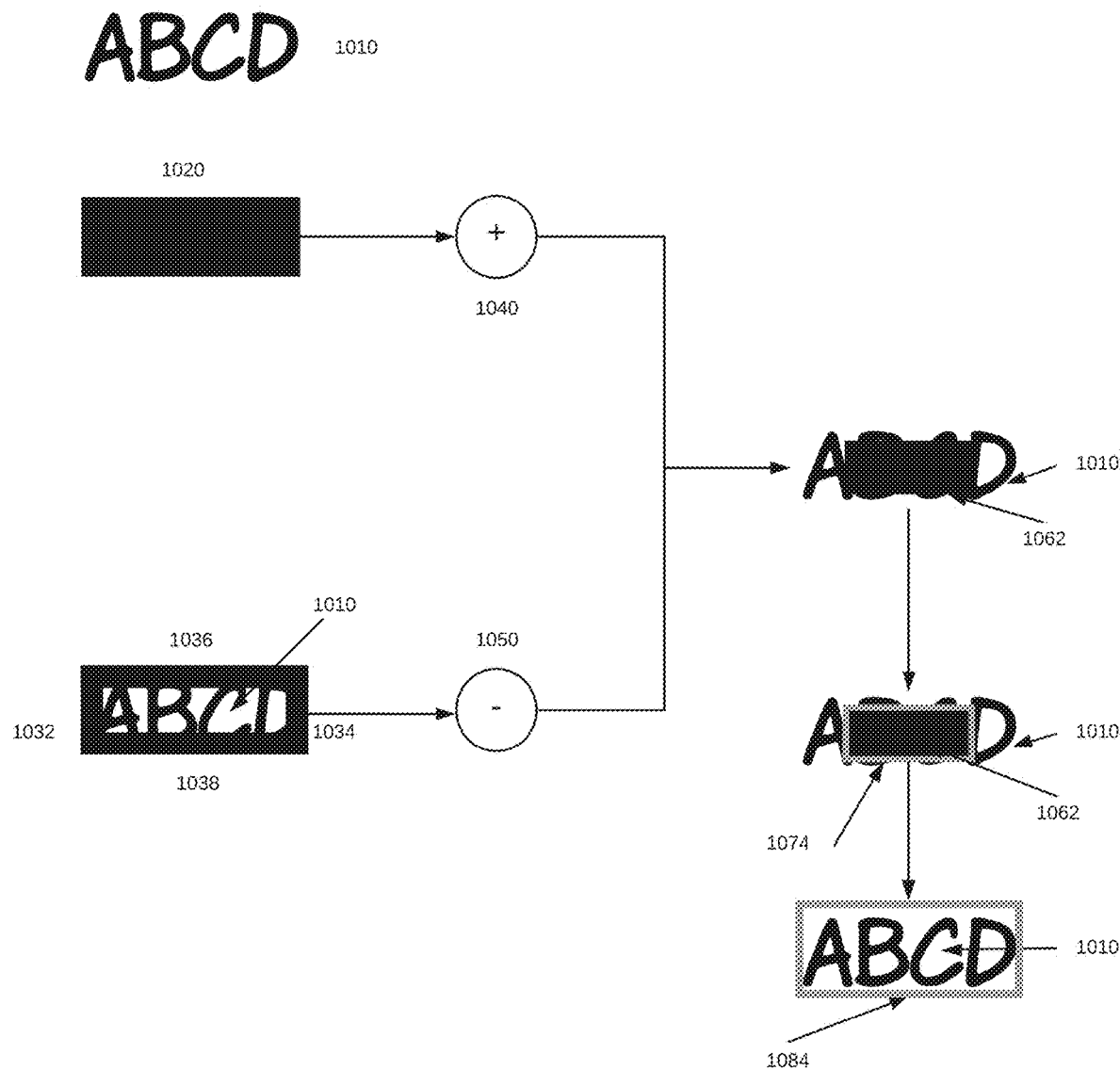
FIG. 10 depicts formulation of bounding boxes for text recognition according to an embodiment.

Looking more closely at FIG. 10, in an upper part of the Figure, text 1010 is covered in a text salient map 1020. In a lower part of the Figure, text 1010 is surrounded by respective skyline maps 1032 (left), 1034 (right), 1036 (top), and 1038 (bottom). The text salient map 1020 and the structure 1010 and 1032-1038 are combined via elements 1040 and 1050 to yield the text and salient map to the right of the horizontal arrow at the right of those elements, with text 1010 partly blotted by remaining salient map 1062. From this, text 1010 and remaining salient map 1062 are provided with a bounding box 1074 surrounding the remaining salient map 1062. From there, the bounding box 1074 is enlarged to bounding box 1084 which surrounds text 1010. In one aspect, bounding box 1084 has the same perimeter and/or area as text salient map 1020, using the perimeter and/or area of text salient map 1020 to define the size of bounding box 1084.

Figure 11:
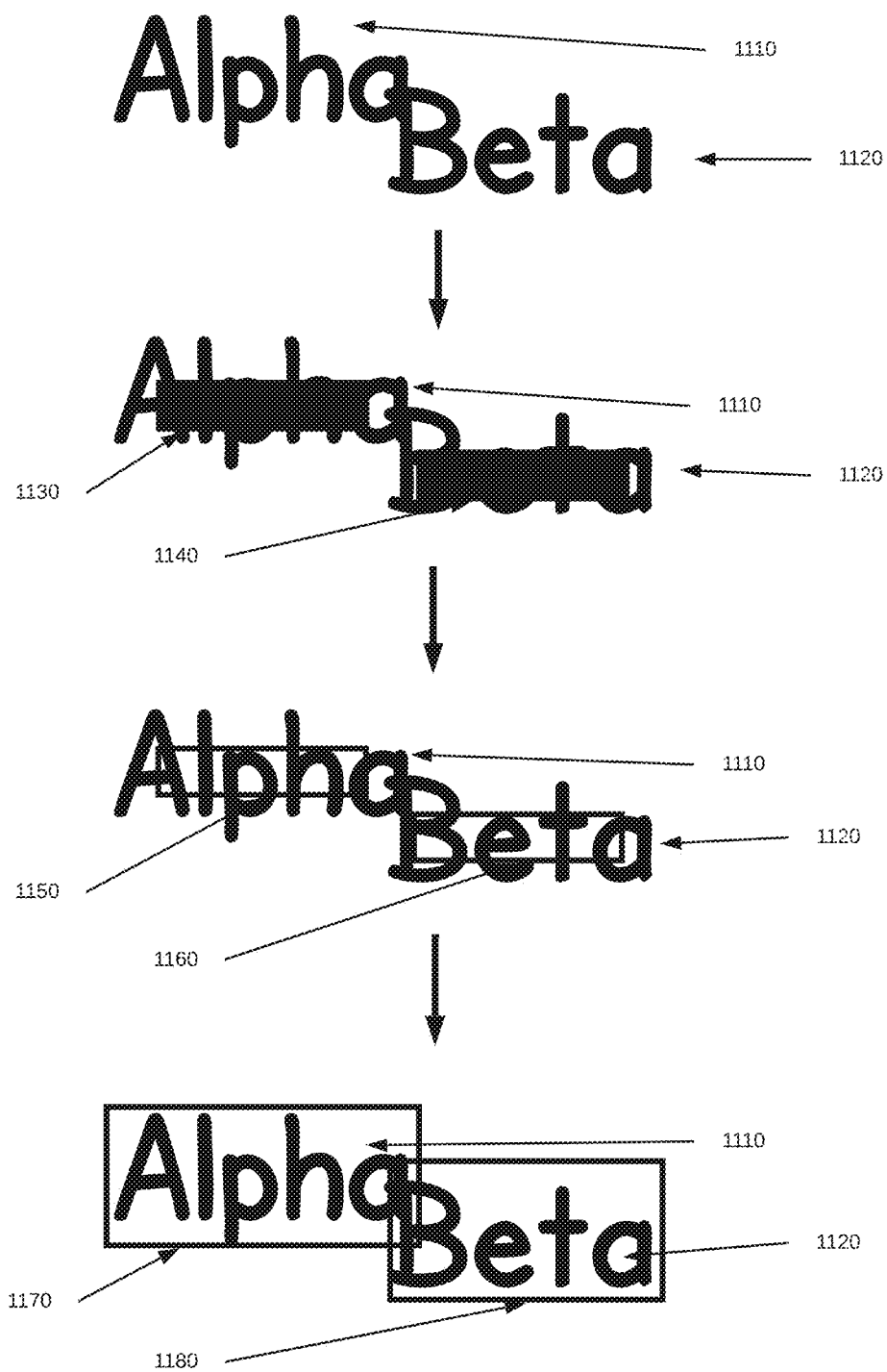
FIG. 11 depicts formulation of bounding boxes for text recognition according to an embodiment.
Figure 12:
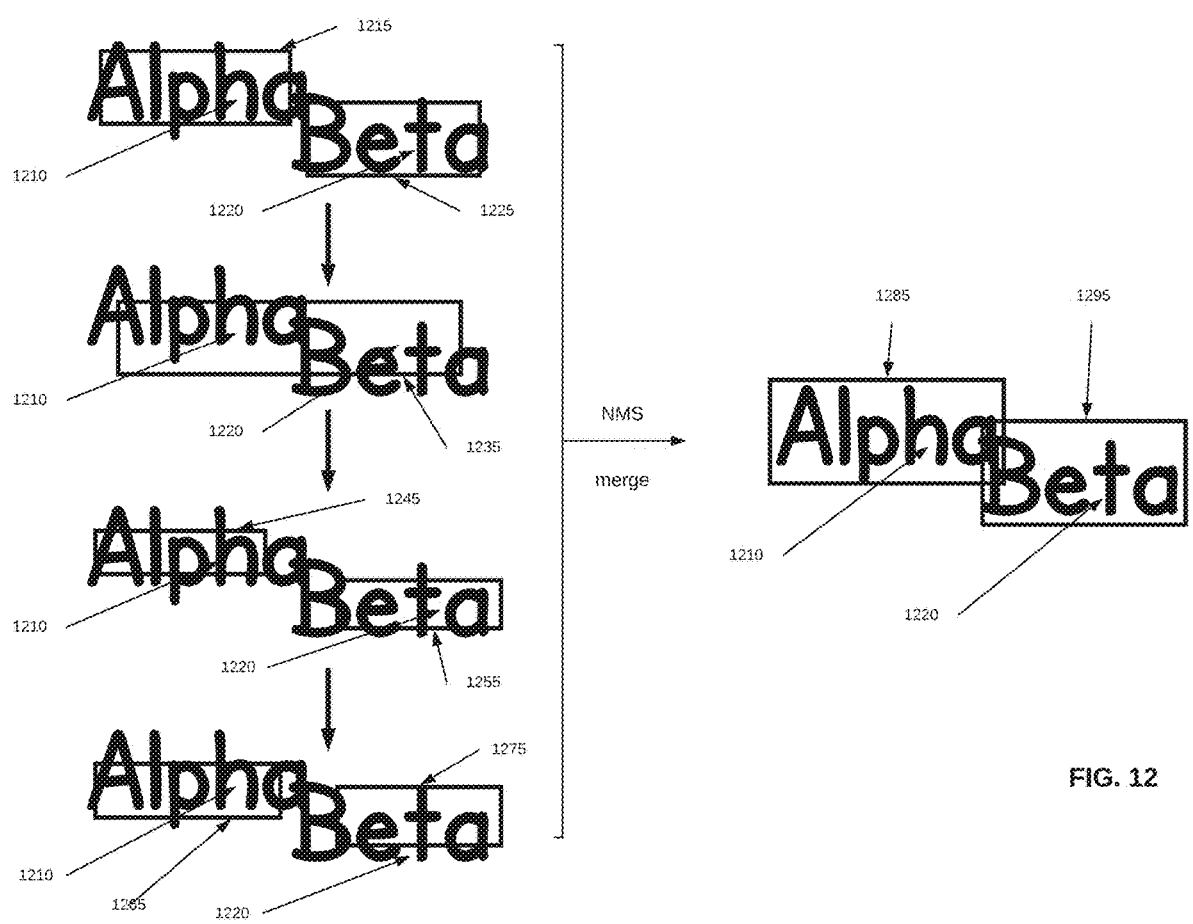
FIG. 12 depicts formulation of bounding boxes for text recognition according to an embodiment.
Figure 13:
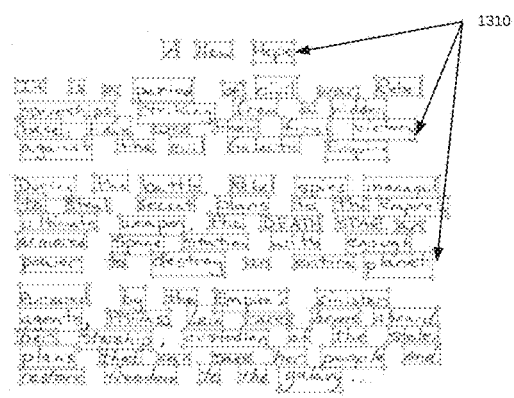
FIG. 13 depicts ground truth identification for the handwritten text of FIG. 4.

From the immediately preceding discussion, and from what follows with respect to FIGS. 11 and 12, ordinarily skilled artisans will appreciate that overlapping text can be separated with a relatively minimal training set, and with the position maps (skyline maps 1032-1038) that are generated. By using the training set with a separate and independently trained detection channel to generate each such position map, it is possible to identify overlapping regions to separate the text appropriately. As a practical matter, fewer than all of the position maps (for example, one or two such maps) may suffice to identify the overlapped text (for example, where the position maps overlap with the overlapping text). In one aspect, for training purposes, a sufficient number of training text examples with different levels of overlap may be employed. Not all possible overlapping situations need to be addressed. Obviously handwritten text will have inconsistencies, even when the same person does the writing, let alone when different people do the writing. With a reasonable assumption that the writer intends the text to be legible, there can be a limit on the number of overlapping situations that need to be accounted for.

Looking first at FIG. 11, input text 1110 overlaps with input text 1120. Specifically, a lowercase "a" at the end of the word "Alpha" overlaps with uppercase "B" at the beginning of the word "Beta". Partial text salient maps 1130, 1140 result from the output of the process described above with respect to FIG. 10. Bounding boxes 1150, 1160 correspond to outer perimeters of respective partial text salient maps 1130, 1140. Finally, recovered bounding boxes 1170, 1180 correspond to perimeters of original text salient maps (as in FIG. 10) which track the skyline of the respective text 1110, 1120. In the example of FIG. 12, it may be noted that a portion of the lowercase "p" in "Alpha" extends below the normal writing line, but nevertheless that portion forms a part of the overall skyline for the word "Alpha".

Bounding boxes 1170, 1180 overlap. In one aspect, a concept known as Intersection over Union (IoU), which will be familiar to ordinarily skilled artisans, may be employed to facilitate separation of bounding boxes for different words. Where there is relatively little overlap between words, and hence between bounding boxes for those words, as most often will be the case with text, IoU can facilitate a determination that two bounding boxes (and hence the words within those bounding boxes) should be separated.

Looking now at FIG. 12, respective text 1210, 1220 is provided. Bounding boxes are generated at a plurality of confidence levels. The various bounding boxes may be generated according to techniques discussed above with respect to FIGS. 10 and 11. Bounding boxes 1215, 1225 are generated, for example, at a 95% confidence level. Bounding box 1235, covering the overlapping text 1210, 1220, is generated at a 50% confidence level. In one aspect, the reduced confidence level results from the generation of a single bounding box for the overlapping text. Also in FIG. 11, bounding boxes 1245, 1255, for the respective text 1210, 1220, and representing separate bounding boxes corresponding to the single bounding box 1235, are generated at a 50% confidence level. Bounding boxes 1265, 1275, also generated at a 50% confidence level, are positioned differently with respect to text 1210, 1220 than are bounding boxes 1245, 1255. In one aspect, a non-maximum suppression (NMS) algorithm may be applied to merge the just-discussed bounding boxes, removing the bounding boxes with low confidence level (for example, bounding boxes 1235, 1245, 1255, 1265, and 1275), and retaining the bounding boxes with a higher confidence level (for example, bounding boxes 1215, 1225). In an embodiment, applying an NMS algorithm may facilitate ultimate recognition of text.

According to different embodiments, different boxes representing different confidence levels, with different degrees of removal of the salient map, may be generated. In one aspect, lower confidence levels may be quicker to generate, and may be reasonably reliable provided that the handwritten text being input is relatively easier to recognize. Based on these various just-discussed bounding boxes, in an embodiment a non-maximum suppression (NMS) algorithm is applied to have optimal bounding boxes 1285, 1295 surrounding respective text 1210, 1220 as in FIGS. 10 and 11.

Figure 14:
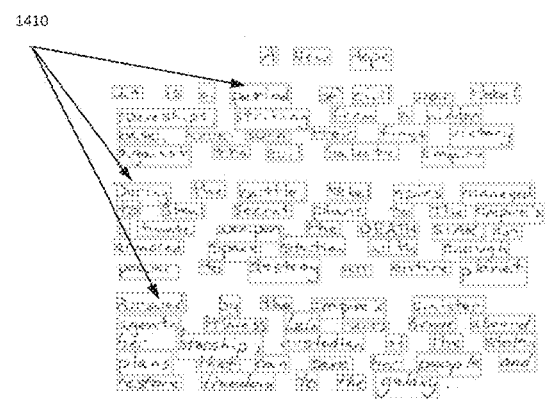
FIG. 14 depicts the results of bounding box generation according to an embodiment.
Figure 15A:
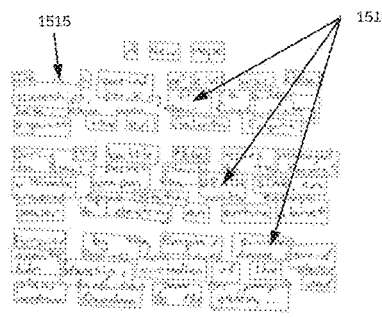
FIGS. 15A and 15B depict comparative results for prior bounding box generation approaches, and FIG. 15C corresponds to FIG. 14.
Figure 15B:
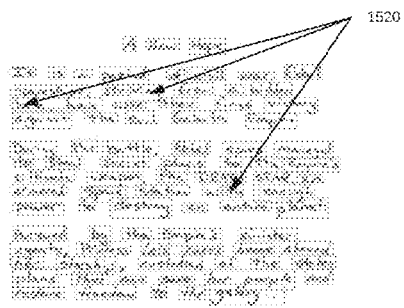
Figure 15C:
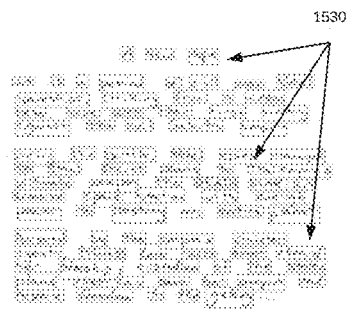

FIGS. 13, 14, and 15A-C are provided to display results achieved in accordance with aspects of the invention, based on text as in FIG. 4, and to contrast those results with results of other approaches. The text in FIG. 4 has differently-sized letters, and different amounts of overlap of some words. Looking first at FIG. 13, ground truth boxes 1310 surround individual text words closely. FIG. 14 and FIG. 15C show results according to aspects of the invention. As can be seen, bounding boxes 1410, 1530 also closely surround individual text words, without splitting words, and without surrounding pairs of words or portions of pairs of words.

In contrast to the results shown in FIG. 14 and FIG. 15C, FIG. 15A shows results achieved using the YOLOv3 technique mentioned earlier. As noted earlier, YOLOv3, which is used more often for objects, can enable object identification more generally. Object recognition can be more challenging with this approach, because it does not differentiate as easily among particular types of objects. YOLOv3 may enable identification of a car from among other objects, for example, but as far as actually recognizing a type of car, the technique is more limited. As can be seen in FIG. 15A, some of the bounding boxes 1510 surround words on different text lines. The technique also fails to identify one of the words, as indicated at 1515.

FIG. 15B shows results achieved using the EAST technique mentioned earlier. As can be seen from items 1520, the formation of bounding boxes is inconsistent. Some bounding boxes split words. Others surround multiple words.

In contrast to the results from YOLOv3 and EAST, by taking advantage of the skyline aspect that words tend to follow, training data can be obtained more reliably, and bounding boxes derived more accurately.

Figure 16:
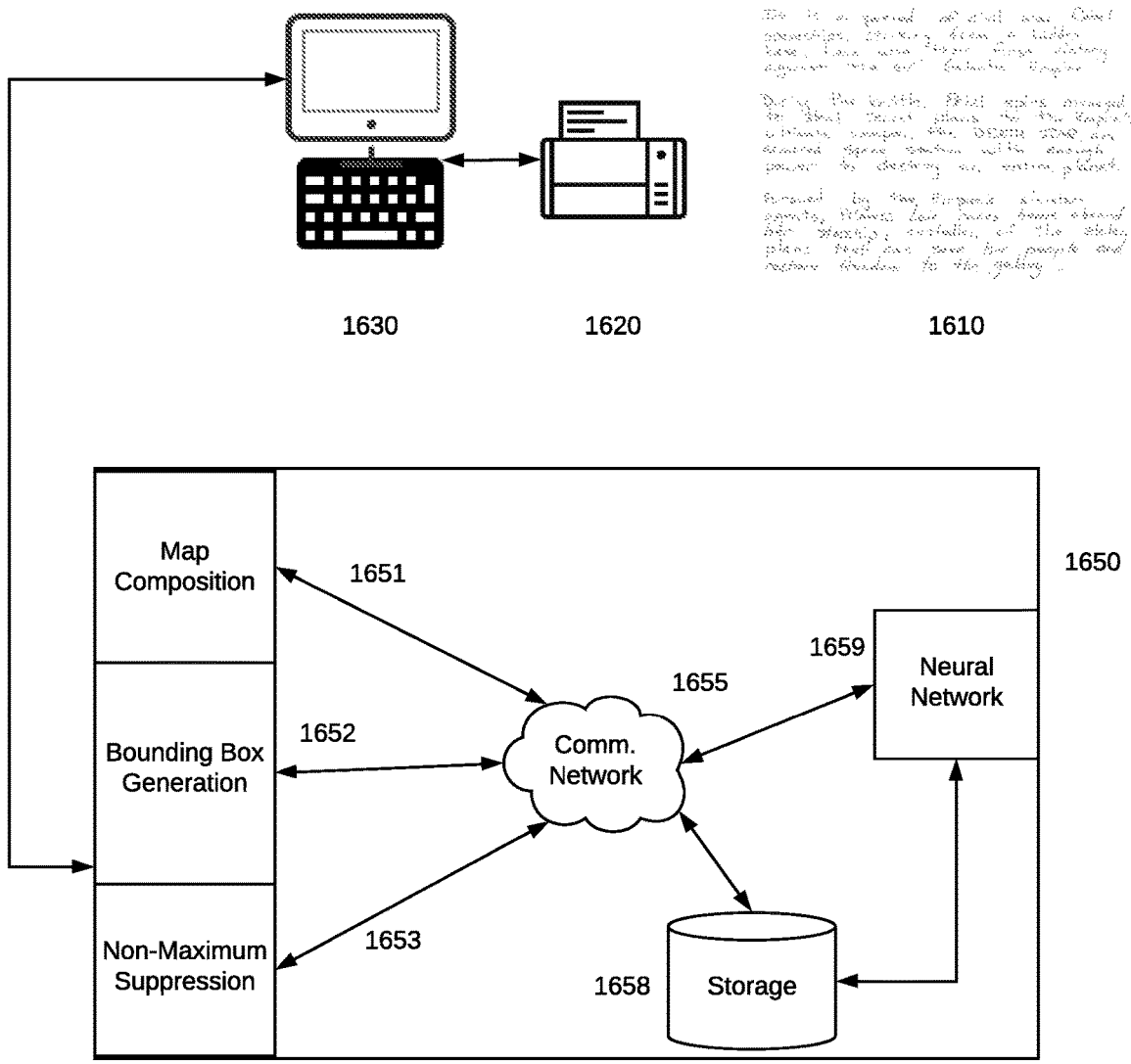
FIG. 16 is a high level diagram of a system according to an embodiment.

FIG. 16 depicts, at a high level, a system for implementing the text location methods detailed above. In FIG. 16, text 1610 is input to scanner 1620 which is attached to computing or other suitable processing equipment 1630. In an embodiment, the equipment 1630 communicates with a larger processing system 1650 comprising various processors and volatile and non-volatile storage and employing, among other things, neural network 1690 of the types discussed herein, or other appropriate deep learning system. In an embodiment, scanner 1620 communicates directly with processing system 1650. In another aspect, equipment 1630 may include a neural network or other appropriate deep learning system, obviating the need for additional processing system 1650. In this circumstance, in one aspect equipment 1630 may include both a central processing unit (CPU) and a graphics processing unit (GPU), with cores of the GPU implementing the neural network or other appropriate deep learning system.

In an embodiment, components of system 1650 include various computing structure 1651-1653 to implement the various types of processing, such as map composition, bounding box generation, and non-maximum suppression, discussed earlier. In an embodiment, computing structure 1651-1653 may be part of equipment 1630. The computing structures are not detailed here. Various functions discussed earlier are grouped together merely for ease of reference. The grouping should not be taken to infer that the specific functions called out within a particular computing structure block necessarily are performed together, or that they go together. In an embodiment, a neural network 1659, of the type discussed earlier, performs processing as discussed with respect to FIGS. 2 and 3, and provides outputs to one or more of elements 1651-1653, either directly or through a communications network 1655. In an embodiment, the neural network may be accessible in the cloud. Results of the calculations may be stored in storage 1658, which may be connected to the neural network 1659 or computing structure 1651-1653 in any number of ways, one way being shown in FIG. 16 merely as an example. Contents of storage 1658 may be communicated to other computing structure as appropriate to carry on the process, through text identification, to text recognition. In an embodiment, results of the calculations may be communicated directly to the other computing structure without an intermediate storage process.

While the foregoing describes embodiments according to aspects of the invention, the invention is not to be considered as limited to those embodiments or aspects. Ordinarily skilled artisans will appreciate variants of the invention within the scope and spirit of the appended claims.

What is claimed is:

1. A method comprising:
   inputting a text-containing document to a deep learning system having five detection channels to locate text based on a skyline appearance of each word of text in the text-containing document, wherein at least two words in the text-containing document are overlapping;
   providing an output of each of the five detection channels to generate a plurality of maps based on the skyline appearance, wherein the providing comprises:
   providing a first output as a text salient map covering each word of text;
   providing a second output as a text skyline left map at a lefthand portion of each word of text;
   providing a third output as a text skyline right map at a righthand portion of each word of text;
   providing a fourth output as a text skyline top map at a topmost portion of each word of text;
   providing a fifth output as a text skyline bottom map at a left portion of each word of text;
   composing a map of the text using the generated maps;
   for each two of the at least two overlapping words in the text-containing document:
   generating two overlapping bounding boxes using the generated maps, wherein the generating comprises;
   combining the text salient map with the text skyline left map, the text skyline right map, the text skyline top map, and the text skyline bottom map, and with each of the at least two words of text, to generate each of the at least two words of text with a remaining portion of the text salient map for each of the at least two words of text superimposed thereon;
   determining a perimeter of the remaining portion of the text salient map for each of the at least two words of text; and
   based on the text salient map for each of the at least two words of text, expanding each perimeter to generate the bounding box for each of the at least two words of text;
   the method further comprising:
   separating the two overlapping bounding boxes into separate bounding boxes based on the maps; and
   recognizing the two overlapping words of text corresponding to the two bounding boxes.

2. The method of claim 1, wherein the deep learning system comprises a fully convolutional network.

3. The method of claim 1, wherein the generating comprises outputting a plurality of bounding boxes, each at a different respective confidence level, the method further comprising performing non-maximum suppression on each of the generated bounding boxes to facilitate combining of bounding boxes for adjacent or overlapping words.

4. The method of claim 1, wherein the plurality of maps include a first map which covers an entirety of each individual word of text; a second map which covers a left-hand portion of each word of text; a third map which covers a right-hand portion of each word of text; a fourth map which covers a top portion of each word of text; and a fifth map which covers a bottom portion of each word of text.

5. The method of claim 1, further comprising training the deep learning system using a first document containing text and a second document with a map that covers an entirety of each individual word of text.

6. The method of claim 1, wherein at least two words of text in the text-containing document are overlapping, each of the overlapping words having its own skyline appearance, wherein the generating comprises outputting a plurality of bounding boxes, each at a different respective confidence level, the method further comprising performing non-maximum suppression on each of the generated bounding boxes to facilitate combining of bounding boxes for adjacent or overlapping words.

7. The method of claim 1, wherein the deep learning system comprises a neural network having a plurality of convolution layers, a plurality of nonlinear layers, a plurality of intermediate layers, and at least one detection layer, and wherein the providing comprises:
   merging an up-sampled feature map from a first intermediate layer and an output of a first nonlinear layer and providing a first merged result to a second intermediate layer;
   merging an up-sampled feature map of the first merged result from the second intermediate layer and an output of a second nonlinear layer and providing a second merged result to the third intermediate layer;
   merging an up-sampled feature map of the second merged result from the third intermediate layer and an output of a third nonlinear layer and providing a third merged result to the fourth intermediate layer;
   merging an up-sampled feature map of the third merged result from the fourth intermediate layer and an output of a fourth nonlinear layer and providing a fourth merged result to the fifth intermediate layer;
   merging an up-sampled feature map of the fourth merged result from the fourth intermediate layer and an output of a fifth nonlinear layer and providing a fifth merged result to the detection layer.

8. A computer-implemented system comprising a deep learning system having five detection channels, the computer-implemented system to perform a method comprising:
   inputting a text-containing document to the deep learning system to locate text based on a skyline appearance of each word of text in the text-containing document, wherein at least two words in the text-containing document are overlapping;
   providing an output of each of the plurality of detection channels to generate a plurality of maps based on the skyline appearance, wherein the providing comprises:
      at a first one of the detection channels, providing a first output as a text salient map covering each word of text;
      at a second one of the detection channels, providing a second output as a text skyline left map at a lefthand portion of each word of text at a second of the detection channels;
      at a third one of the detection channels, providing a third output as a text skyline right map at a righthand portion of each word of text;
      at a fourth one of the detection channels, providing a fourth output as a text skyline top map at a topmost portion of each word of text;
      at a fifth one of the detection channels, providing a fifth output as a text skyline bottom map at a left portion of each word of text composing a map of the text using the generated maps;
   for each two of the at least two overlapping words in the text-containing document:
   generating two overlapping bounding boxes using the generated maps, wherein the generating comprises:
      combining the text salient map with the text skyline left map, the text skyline right map, the text skyline top map, and the text skyline bottom map, and with each of the at least two words of text, to generate each of the at least two words of text with a remaining portion of the text salient map for each of the at least two words of text superimposed thereon;
      determining a perimeter of the remaining portion of the text salient map for each of the at least two words of text; and
      based on the text salient map for each of the at least two words of text, expanding each perimeter to generate the bounding box for each of the at least two words of text;
   wherein the method further comprises:
      separating the two overlapping bounding boxes into separate bounding boxes based on the maps; and
      recognizing the two overlapping words of text corresponding to the two bounding boxes.

9. The computer-implemented system of claim 8, wherein the deep learning system comprises a fully convolutional network.

10. The computer-implemented system of claim 8, wherein the generating comprises outputting a plurality of bounding boxes, each at a different respective confidence level, the method further comprising performing non-maximum suppression on each of the generated bounding boxes to facilitate combining of bounding boxes for adjacent or overlapping words.

11. The computer-implemented system of claim 8, wherein the plurality of maps include a first map which covers an entirety of each individual word of text; a second map which covers a left-hand portion of each word of text; a third map which covers a right-hand portion of each word of text; a fourth map which covers a top portion of each word of text; and a fifth map which covers a bottom portion of each word of text.

12. The computer-implemented system of claim 8, further comprising training the deep learning system using a first document containing text and a second document with a map that covers an entirety of each individual word of text.

13. The computer-implemented system of claim 8, wherein at least two words of text in the text-containing document are overlapping, each of the overlapping words having its own skyline appearance, wherein the generating comprises outputting a plurality of bounding boxes, each at a different respective confidence level, the method further comprising performing non-maximum suppression on each of the generated bounding boxes to facilitate combining of bounding boxes for adjacent or overlapping words.

14. The computer-implemented system of claim 8, wherein the deep learning system comprises a neural network having a plurality of convolution layers, a plurality of nonlinear layers, a plurality of intermediate layers, and at least one detection layer, and wherein the providing comprises:
   merging an up-sampled feature map from a first intermediate layer and an output of a first nonlinear layer and providing a first merged result to a second intermediate layer;
   merging an up-sampled feature map of the first merged result from the second intermediate layer and an output of a second nonlinear layer and providing a second merged result to the third intermediate layer;
   merging an up-sampled feature map of the second merged result from the third intermediate layer and an output of a third nonlinear layer and providing a third merged result to the fourth intermediate layer;
   merging an up-sampled feature map of the third merged result from the fourth intermediate layer and an output of a fourth nonlinear layer and providing a fourth merged result to the fifth intermediate layer;
   merging an up-sampled feature map of the fourth merged result from the fourth intermediate layer and an output of a fifth nonlinear layer and providing a fifth merged result to the detection layer.

15. The method of claim 1, wherein the skyline appearance of each word of text in the text-containing document separates one word from another word.

16. The computer-implemented system of claim 8, wherein the skyline appearance of each word of text in the text-containing document separates one word from another word.

* * * * *